Sept. 6, 1932.  W. L. TRUMPHOUR ET AL  1,875,959
CHUCK
Filed Jan. 2, 1929  7 Sheets-Sheet 5

Sept. 6, 1932.  W. L. TRUMPHOUR ET AL  1,875,959
CHUCK
Filed Jan. 2, 1929  7 Sheets-Sheet 7

Patented Sept. 6, 1932

1,875,959

UNITED STATES PATENT OFFICE

WILLIAM L. TRUMPHOUR, OF CLEVELAND, AND MAX E. LANGE, OF CLEVELAND HEIGHTS, OHIO, ASSIGNORS TO THE WARNER & SWASEY COMPANY, OF CLEVELAND, OHIO, A CORPORATION OF OHIO

CHUCK

Application filed January 2, 1929. Serial No. 329,700.

This invention relates to work holding chucks for machine tools and has for its chief object to provide a chuck which is provided with work holding means so supported relative to the chuck body that the work piece can be moved to different positions so as to centralize different portions to be machined.

A further object is to accomplish this result with a trunnioned work holder which can be turned to different positions and effectively secured therein.

Still further, the invention aims to provide a construction wherein the positioning of different parts of the work to be machined can be accomplished by a lateral movement of one part relative to another, as well as by a rotary movement of the part which immediately supports the work piece.

A further object is to provide a simple but effective means for definitely locating the relatively movable parts in the different working positions and for clamping them in position so that the work piece will be accurately positioned during the machining operations.

The above and other objects are attained by this invention which may be briefly summarized as consisting in certain novel combinations and arrangements of parts and details of construction which will be described in the specification and set forth in the appended claims.

In the accompanying sheets of drawings.

Figure 3:
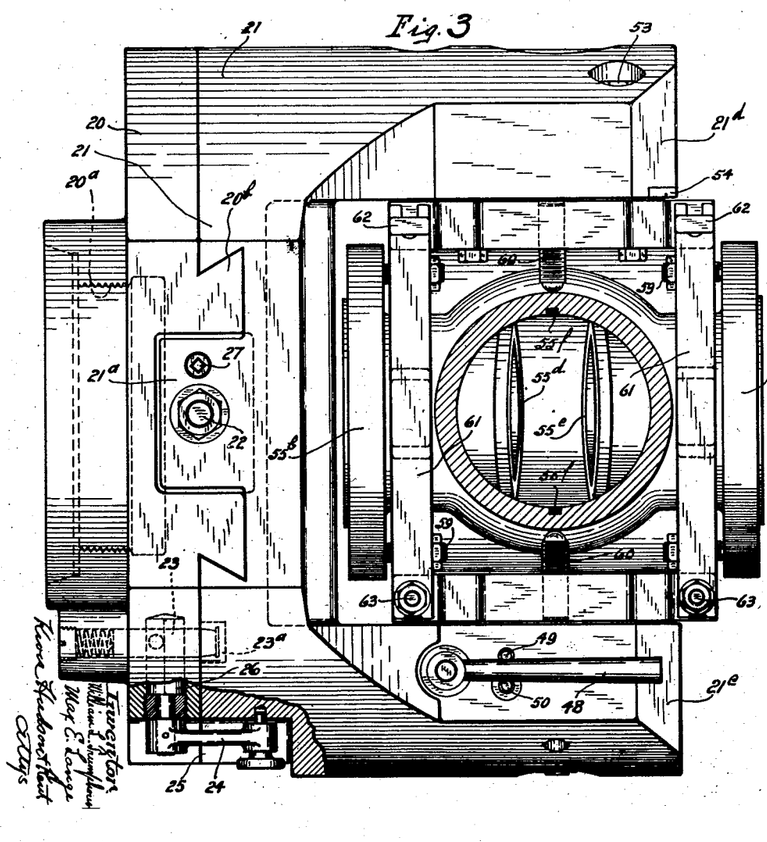
Fig. 3 is another side view taken at right angles to the view shown in Fig. 1, with a portion of the work piece which is supported in the chuck in section.

Our improved chuck in this instance includes a so-called adapter 20 and a chuck body 21 which is carried thereby. The adapter has a threaded portion 20ª, see particularly Fig. 7, adapted to be screwed onto a rotating work spindle of a lathe or other machine tool. The chuck body 21 is movable on the adapter laterally of the axis of rotation of the chuck, and, accordingly, they have a dovetailed sliding connection consisting in this instance of a dovetail projection 20ᵇ on the face of the adapter engaging in a dovetail slot on the adjacent face of the chuck body (see Figs. 3 and 6). It will be noted by reference to Figs. 6 and 7 that the rear portion of the chuck body has a pair of oppositely disposed lugs 21ª and 21ᵇ which project into recesses formed in the dovetail face of the adapter, the lug 21ᵇ being removable and being secured in position by screws or the like for convenience of assembly. A screw 22 is rotatably mounted in one of the lugs 21ᵃ and has a threaded portion engaging in a threaded socket in the portion of the adapter inwardly of this lug. By turning this screw, the chuck body can be moved laterally in either direction from the central position.

It might be here stated that the purpose of supporting the chuck body on an adapter and of providing means whereby it may be moved laterally on the adapter is, with the cooperation of a rotatable work holder to be explained, to enable different portions of the work piece to be centered for machining purposes. With a work piece such as illustrated herein and to be later described, it is desirable that the chuck body have three definite working positions on the adapter, one being a center position and the other two being at equal distances on opposite sides of the center position.

It is desirable also that the chuck body be definitely located or positioned in its several working positions, and locating means of an effective nature are incorporated in the chuck. To definitely locate the chuck body in its central position on the adapter, we prefer to employ a lock bolt 23 which is carried by the adapter (note Figs. 1, 3 and 6), and is adapted at its inner end to engage a bushing 23ᵃ carried by the chuck body. Provision is made for withdrawing the lock bolt, consisting in this instance of a small lever 24 capable of being swung in adjacent recessed portions 25 of the adapter and the chuck body (see particularly Fig. 3), this lever being mounted on the outer end of a rotatable bolt retractor 26 having a suitable cam portion adapted to engage a pin on the lock bolt to retract it from the bushing 23ᵃ. As usual, a spring behind the lock bolt will cause it to snap into the bushing 23ᵃ when released by the retractor.

Figure 6:
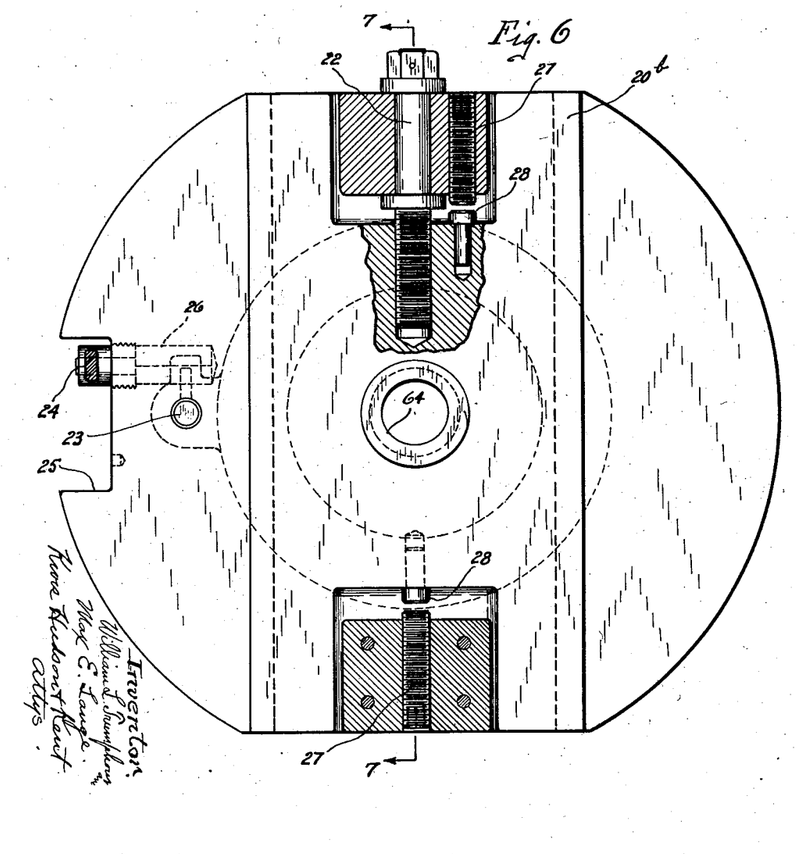
Fig. 6 is a section substantially along the line 6—6 of Fig. 1, showing the dovetail of the adapter in elevation.

To locate the chuck body in its two off-center working positions on opposite sides of its center position, we have provided in this instance adjustable abutments in the form of screws 27 which are mounted in the lugs 21ᵃ and 21ᵇ of the chuck body and are adapted to engage companion abutments in this instance in the form of pins 28 carried by the adapter, as best illustrated in Fig. 6. When it is desired to shift the chuck body laterally in either direction from central position, the lock bolt 23 is withdrawn by swinging the lever 24, and then the screw 22 is turned in one direction or the other until the two abutments meet to definitely locate the chuck body in one of the two predetermined off-center positions. The two off-center positions are clearly illustrated in Figs. 13 and 14, and the function of the abutments to locate the chuck body in these positions is illustrated.

The chuck body is substantially U-shaped in that it has a back portion which engages the adapter and two forwardly projecting arms designated generally by the reference characters 21ᶜ and 21ᵈ, the inner faces of these arms forming substantially parallel surfaces to accommodate the rotatable or swivelled work holder and the outer sides or faces being preferably curved to conform to the curvature of the adapter.

Rotatably supported by and between the inner parallel faces of the two arms of the chuck body is a work holder designated generally by the reference character 29. This work holder, which for convenience may be termed a cradle, is also substantially U-shaped inasmuch as it has a base portion bridging the space between the inner faces of the arms and two parallel sides 29ᵃ and 29ᵇ which are parallel and close to the inner faces of the arms of the work holder. The swivelling or journaling of the work holding cradle in the arms of the chuck body is accomplished by means of two trunnions 30 and 31. The trunnion 30 is secured to the side 29ᵃ of the cradle, the inner end being flanged and being both fitted and secured in a suitable recess in the side 29ᵃ to form a rigid connection with the cradle, the main part of this trunnion member projecting into a trunnion socket in the arm 21ᶜ. A stem projects from the outer end of this trunnion and a nut 32 is screwed onto the stem so that the side 29ᵃ of the cradle can be drawn up close to the adjacent side of the arm 21ᶜ of the chuck body into engagement with one race of an annular thrust bearing 33 which is mounted in an annular groove formed on the inner face 21ᶜ of the chuck body.

The other trunnion 31 of the cradle has a bearing portion fitted into the journal opening in the arm 21ᵈ of the chuck body and it has a relatively large flange 31ᵃ fitting into a recess formed on the inner side of the arm 21ᵈ, the periphery of this flange being tapered for a purpose to be described. The flange 31ᵃ is bolted to the side 29ᵇ of the cradle to rigidly connect them together and the two parts are centered before being bolted together by a centering pin 34 having a flanged inner portion fitted into a recess on the inner surface of the side 29ᵇ of the cradle and projecting through the side 29ᵇ into the trunnion member 31. Secured to the outer end of the bearing portion of the trunnion member 31 is a disk 35 held in place by screws which, when tightened, draw the flange 31ᵃ of the trunnion member 31 against the inner race of an annular thrust bearing 36 mounted in a recess in the arm 21ᵈ of the chuck body.

With this construction and mounting, the cradle is effectively supported by its trunnions for rotary movement and can be turned freely, the ball bearings taking the lateral thrust on the sides of the cradle in either direction when the work piece supported in the cradle is being machined, and at the same time allowing free movement of the cradle while it is being turned from one working position to another.

The number of working positions to which the cradle may be turned will depend upon the character of the work piece which is supported in the cradle and is adapted to be machined. With the work piece for which our improved chuck has particular utility, the cradle has at least five working positions and with slight variations in the nature of the work piece it may have more or less than five working positions, but the work piece herein illustrated, which will be described presently, and the five working positions to be referred to will suffice to illustrate the principle and the details of construction, as well as the function of the chuck.

We have found it desirable, where work of great accuracy is required, that the cradle be definitely located in its several working positions and that it be clamped in each working position against accidental movement therefrom. Accordingly, we provide between the cradle and the arms of the chuck body position locating and clamping means which will now be described.

To definitely locate the cradle of the work holder in its several working positions, we provide a series of lock bolts, in this instance three lock bolts, designated 37, 38 and 39, which are arranged adjacent each other in the arm 21$^c$ of the chuck body (see particularly Figs. 1 and 5) in an arc of a circle concentric with the axis of the trunnion 30. With these lock bolts there is employed a series of bushings 40, 41, 42, 43, 44, 45 and 46, these bushings being supported by the side 29$^a$ of the cradle and being arranged in an arc of a circle concentric with the axis of the trunnion 30. It may be here stated that the bushings 41 to 45 are utilized in centralizing five portions of the work piece herein illustrated, and the two bushings 40 and 46 will be used with a slight modification of the work piece. Further, it may be stated that the three bushings 41, 43 and 45 arranged 90° apart are utilized with the central lock bolt 37 and the two bushings 42 and 44 are employed with the two outer lock bolts 38 and 39.

Figure 4:
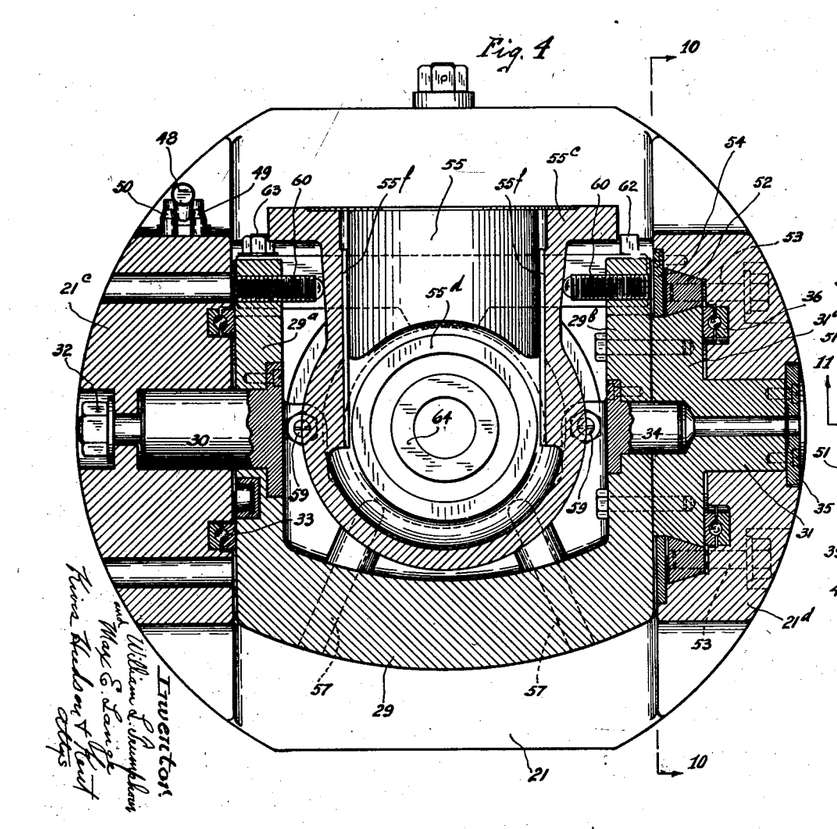
Fig. 4 is a transverse sectional view substantially along the line 4—4 of Fig. 1.
Figure 5:
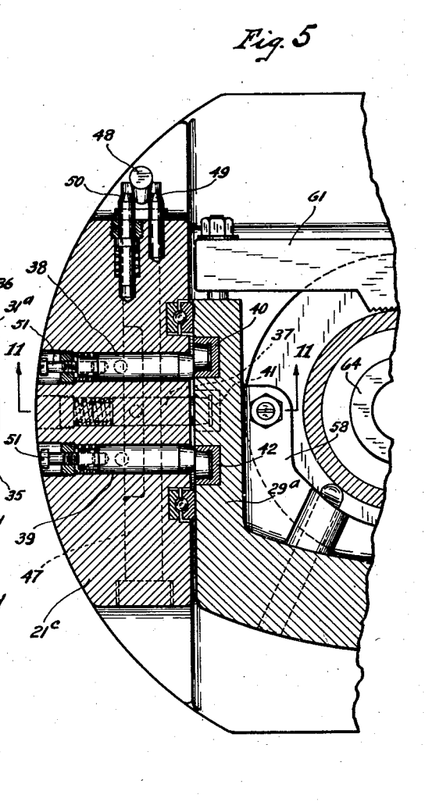
Fig. 5 is a transverse sectional view showing a portion of the chuck, the section being taken substantially along the line 5—5 of Fig. 1.
Figure 11:
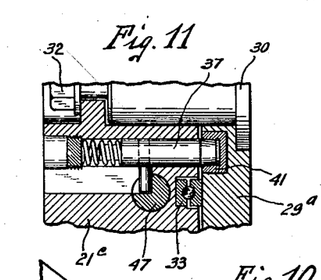
Fig. 11 is a fragmentary sectional view, the section being taken substantially along the line 11—11 of Fig. 5.
Figure 12:
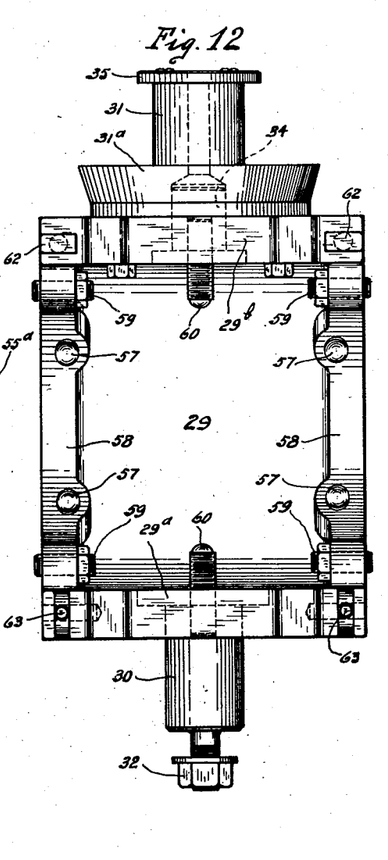
Fig. 12 is a top plan view of the work holding cradle with the clamping bars removed.

In this instance, all three lock bolts 37, 38 and 39 are adapted to be controlled, i. e., withdrawn, by a single bolt retractor 47 which is mounted in the arm 21$^c$ of the work holder (see Fig. 5). This bolt retractor has an angularly shaped cam portion (see Fig. 11) adapted to engage pins on the lock bolts. The retractor 47, which is rotatably mounted, has attached to one end thereof a lever 48 arranged on the side of the arm 21$^c$ of the work holder, this lever being normally held between a fixed pin 49 and a spring actuated or depressible pin 50, these pins normally holding the lever in a position such that the lock bolts are free to engage in the bushings. When the lever is swung from its normal position shown in Figs. 3, 4 and 5, all three lock bolts will be simultaneously retracted and when swung back to its normal position, they are again moved inwardly by the springs associated therewith and the one which is intended to function will snap into the appropriate bushing.

Under certain circumstances or when certain work pieces are being machined, the two outer lock bolts 38 and 39 are unnecessary, and in such cases it may be desirable to retain them in inoperative position out of the control of the retractor 47 and of the springs which normally actuate them inwardly. In order that this may be done, these two lock bolts 38 and 39 are provided with axially disposed screws 51 which pass through spring retaining plugs arranged in the lock bolt sockets and are screwed axially into the lock bolts. By screwing these screws inwardly, the lock bolts can be withdrawn and held in withdrawn position.

Figure 2:
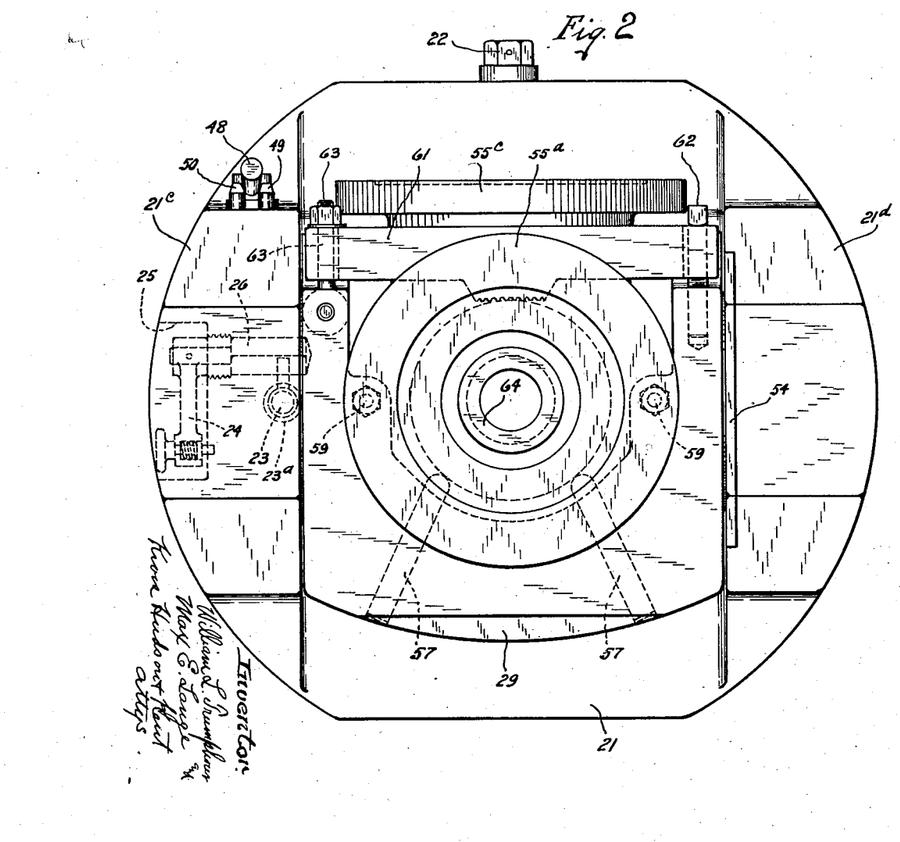
Fig. 2 is a front view of the same.
Figure 10:
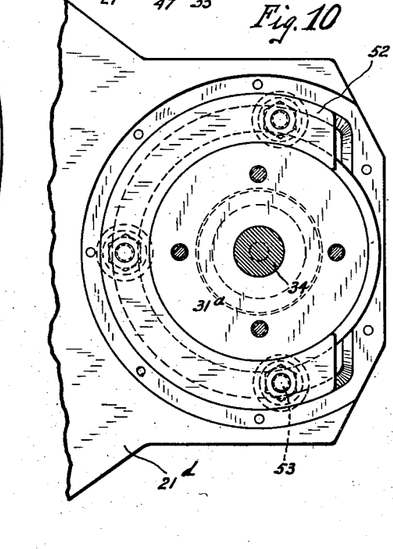
Fig. 10 is a fragmentary view, partly in section, the section being taken substantially along the line 10—10 of Fig. 4 with a cover plate removed.

In order that the cradle may be clamped after being located by one of the lock bolts 37, 38 or 39 in any one of the several working positions, we provide in the arm 21$^d$ of the work holder a tapered arc-shaped clamp 52 which lies between the tapered side of the flange 31$^a$ of the trunnion member 31 and an oppositely tapered face of the recess of the arm 21$^d$ which receives the flange (see Figs. 4 and 10). This clamp is adapted to be pulled outwardly so as to tightly frictionally engage and, therefore, lock the flange of the trunnion member 31 and therefore the entire cradle by means of screws 53, three such screws being shown by dotted lines in Fig. 10, which screws are threaded in the clamp 52 and extend outwardly to the outer side of the arm 21$^d$ of the work holder. Obviously, with this construction, when the screws are loosened the clamp is released and the cradle may be rotated, and when the screws are tightened, it is tightly clamped against movement in the position in which it has been located by one of the lock bolts. The recess on the inner side of the arm 21$^d$ of the work holder which receives the clamp 52 is preferably closed by a cover plate 54 removably held in place by screws or the like to exclude dirt, dust and the like from the working surfaces of the clamp and the two parts which the clamp engages. This cover plate is indicated in section in Fig. 4 and is also indicated in Fig. 2 but is removed from Fig. 10 to show the clamp.

The chuck herein described, though by no means limited in its use to receiving and holding work pieces such as herein illustrated and described, does have especial utility in supporting gate valve bodies and for that reason a work piece of this particular type is illustrated and will be briefly described in connection with the work holding means utilized to clamp the work in the work holder and also to make clear the purpose of the different working positions of the chuck body on the adapter and the different working positions of the work holder in the chuck body. The work piece, in the form of a gate valve body is designated as a whole by the reference character 55. As is usual with bodies for valves of this type, this valve body has a through passageway terminating in two oppositely disposed flanges 55ª and 55ᵇ and a neck at right angles to the through passageway terminating in a flange 55ᶜ which is adapted to receive the valve cap through which the valve gate stem extends. Additionally, the valve body is provided with two inclined valve seat portions 55ᵈ and 55ᵉ which are adapted to receive valve seats designed to be engaged by the opposite tapered sides of the gate or movable valve member proper, these seats being secured in place in the seat portions which are to be machined by facing, boring and threading. The valve body has between the seat portions 55ᵈ and 55ᵉ guides for the valve gate, the guides being usually in the form of slots 55ᶠ.

Figure 15:
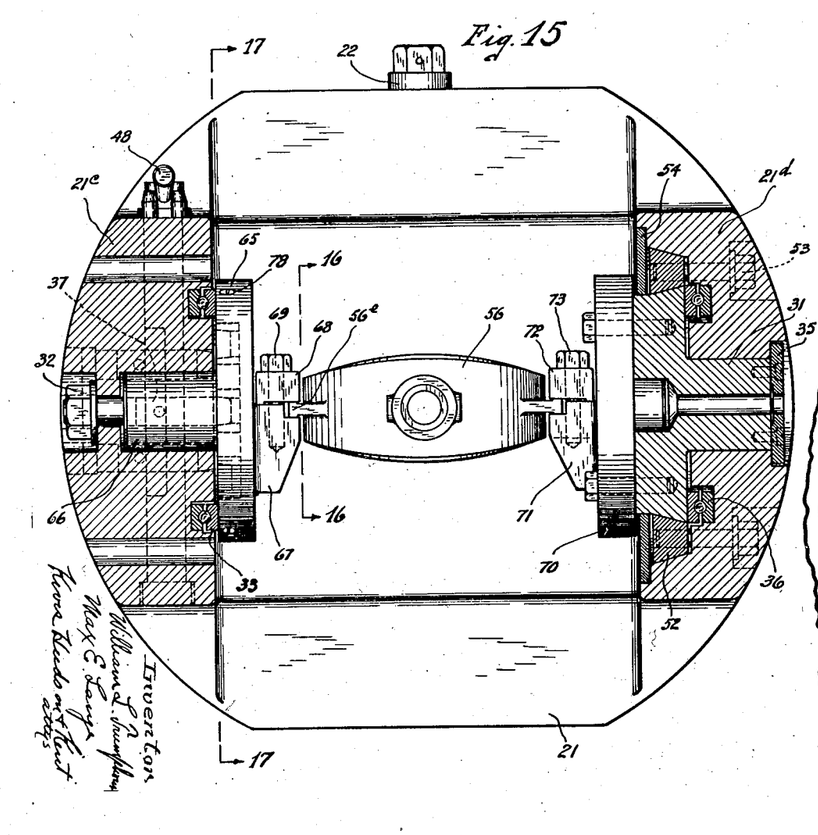
Fig. 15 is a view similar to Fig. 2 with parts in section, showing a different work support substituted for the cradle of Fig. 2 for the purpose of supporting a work piece companion to the work piece which is supported in the cradle of Fig. 2.
Figure 16:
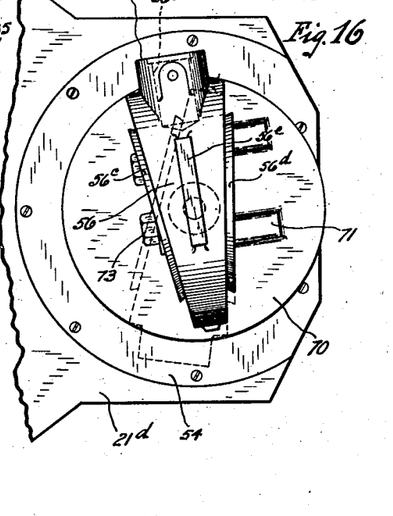
Fig. 16 is a view corresponding to Fig. 10, but showing the work holding means of Fig. 15, the work piece being here shown in elevation, the view here shown being an interior view with the parts viewed substantially from the line 16—16 of Fig. 15.

It might be here stated that with a modification in the work holder this chuck may be utilized for doing all the necessary machine work on the valve gate itself which, in Figs. 15 and 16, is designated 56. In machining this gate, the work holder is adapted to be positioned so as to face the end 56ª and to bore the end at 56ᵇ to receive the stem, and also to machine the opposite tapered sides 56ᶜ and 56ᵈ to receive renewable faces which are adapted to engage the valve seats mounted in the body, as explained.

The valve body 55 is placed in the cradle 29 when the latter is in the position illustrated in Figs. 1, 2, 4 and 5, the valve body being then simply lowered down into the cradle from the top. When the valve body is thus lowered into the cradle, it rests upon a series of supporting screws 57, two pairs of these screws being utilized. These screws extend diagonally up through the bottom portion of the cradle and upwardly through ribs 58 which are arranged at both ends of the cradle and project inwardly from the bottom and sides. The outline of these ribs indicated in Fig. 4 will show that they extend across the bottom and up for a distance along the sides. These screws are adjustable to fit the size of the valve body and it will be noted that they engage what is then the under part of the valve body and in fact the circular portions of the latter just inside the flanges 55ª and 55ᵇ. The upper ends of the ribs 58 are provided with screws 59 which are adapted to engage the inner faces of the flanges 55ª and 55ᵇ so as to locate and hold the valve body against endwise movement, these screws engaging the flanges on substantially the center plane of the fixture, as illustrated in Fig. 4. Additionally, the upper or free ends of the sides of the cradle have inwardly projecting screws 60 which engage opposite sides of the neck of the valve body and thus hold it against rotary movement in the cradle. The valve body is now held against movement in all directions except an upward movement and to hold it against movement in this direction, we employ two clamping bars 61 which extend across or bridge the sides of the cradle, these two bars having intermediate their ends clamping portions 61ª which engage the valve bodies just inwardly of the flanges 55ª and 55ᵇ and in fact directly opposite the lower supporting screws 57, thus forming in effect a three-point contact for each end of the valve body. The ends of these clamping bars are slotted, as shown at 61ᵇ, to receive clamping bolts. Preferably one end of each bar engages under the head of an adjustable T-bolt 62, and the opposite end of the bar is clamped down by a swinging bolt 63, the bolts of course engaging in the slotted ends of the bars, as illustrated particularly in Figs. 2 and 3, and the sides of the chuck body and of the cradle being so formed that these hinge bolts can be swung outwardly to disengage the bars and inwardly to engage them. It will be observed that the cradle with these clamping bars 61 and the work holding screws constitutes the complete swivelled or rotatable work holder and that when the work piece is placed in the cradle and secured in place in the manner described it is held rigidly in the cradle against movement in any direction.

Figures 1, 8, 9:
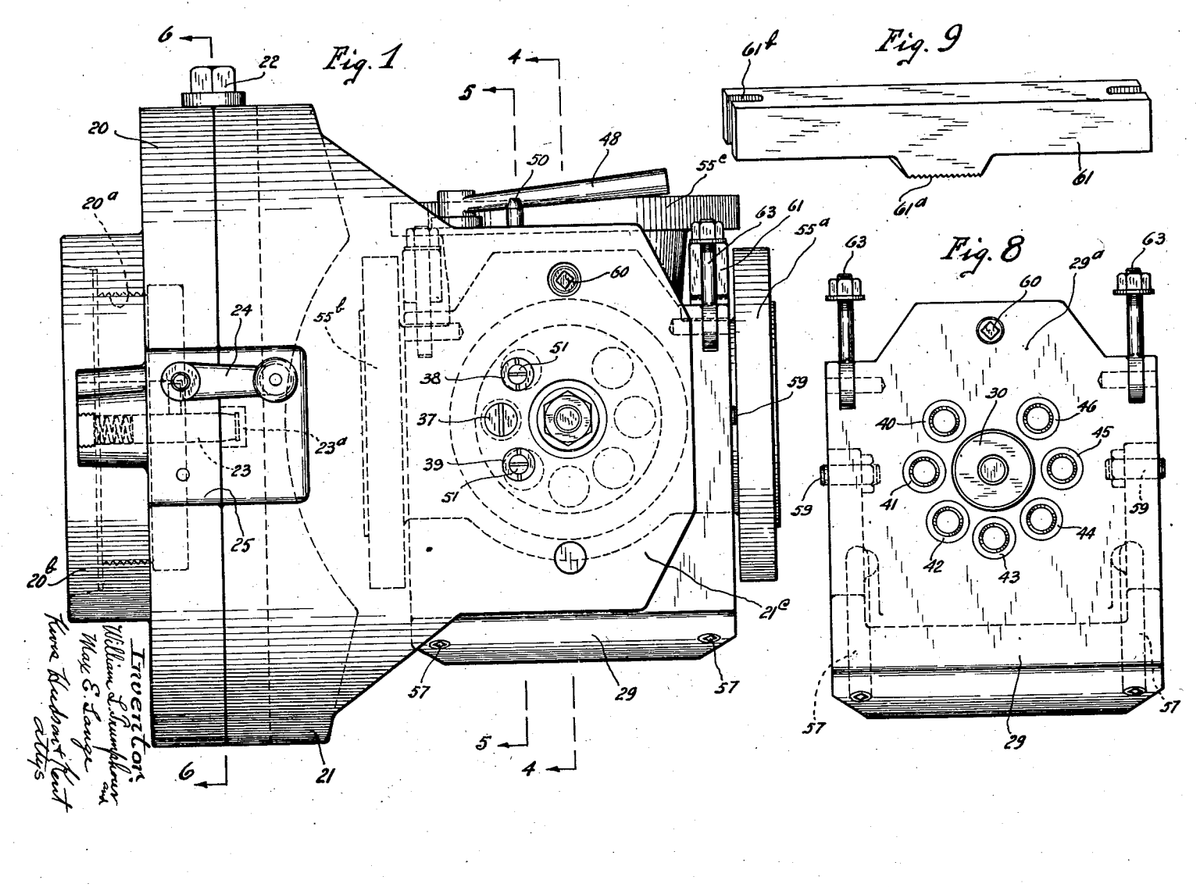
Fig. 1 is a side view of a chuck embodying our invention.
Fig. 8 is a side view of the rotatable work supporting member or cradle removed from the chuck body.
Fig. 9 is a perspective view of one of two clamping bars forming a part of the cradle, the clamping bars being omitted from Fig. 8.

When the valve body has been placed in the chuck and secured in position as explained, the machining can be started. Generally the flanges 55ª, 55ᵇ and 55ᶜ are successively machined, this including facing, boring and turning operations. When these portions of the valve body are being machined, the chuck body occupies its central position with respect to the adapter, being then held in that position by means of the lock bolt 23. Furthermore, the machining of these portions of the valve body requires that the work holder or cradle be located and clamped in three of its different working positions 90° apart. When in these working positions, the cradle is in each instance located (prior to being clamped in position) by the central lock bolt 37 which for these three positions engages the three bushings 41, 43 and 45, which, as will be seen by reference to Fig. 8, are arranged 90° apart.

When it is desired to machine the valve seat portions 55ᵈ and 55ᵉ which portions are inclined with respect to each other and with respect to the axis of the valve body, it is necessary not only to turn the cradle to two additional working positions to bring either portion 55ᵈ or 55ᵉ in a position at right angles to the axis of the work spindle of the machine tool, but it also requires a movement of the chuck body on the adapter to bring it to one or the other of its off-center working positions in order to center the bore of the portion 55ᵈ or 55ᵉ with reference to the work spindle. To thus move the chuck body, the lock bolt 23 is first withdrawn and then the screw 22 is actuated until the proper pair of abutments 27 and 28 engage, one pair of abutments engaging for one off-center position utilized in machining one of the two portions 55ᵈ and 55ᵉ, and the other pair of abutments engaging when the chuck body is moved to its opposite off-center working position when the other of these portions of the valve body is to be machined.

Figure 13:
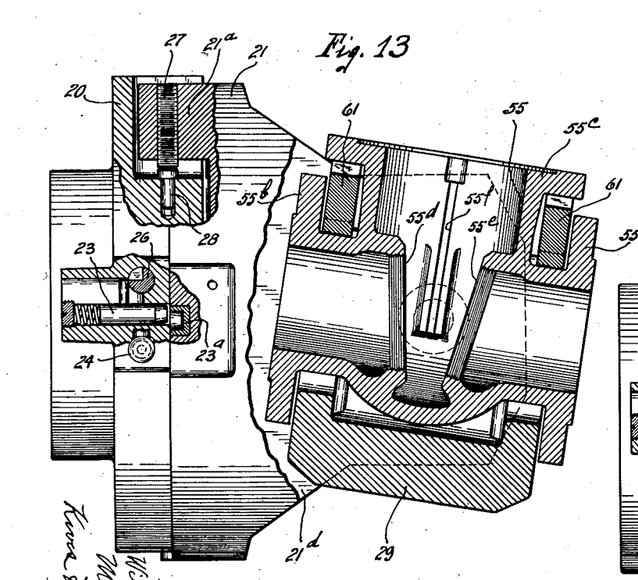
Figs. 13 and 14 are side views of the chuck, similar to Fig. 1, with portions in section and the parts shown on a reduced scale, these two views showing the relatively movable parts of the chuck in different positions for machining different parts of the work piece.
Figure 14:
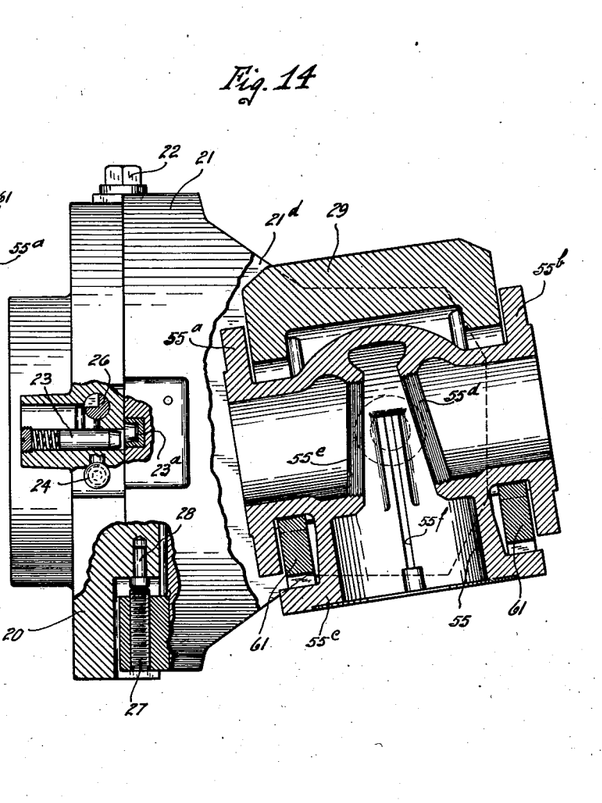

When the cradle is rocked to bring the portion 55ᵈ in a plane at right angles to the axis of the work spindle, the lock bolt 39 now functions to locate the cradle in the proper position by engaging the bushing 42, and when the chuck body has been moved to the necessary off-center position so as to centralize the portion to be bored with reference to the axis of the work spindle, the parts will be in the relative positions shown in Fig. 13, the upper abutments 27 and 28 then engaging.

When it is desired to machine the portion 55ᵉ, the cradle must be turned substantially 180° from the position which it occupies in Fig. 13, in which event the lock bolt 38 now functions to locate this working position of the cradle by snapping into the bushing 44. When the chuck body has been moved to the opposite off-center position with respect to the adapter, the parts will occupy the relative positions shown in Fig. 14.

With the above described operations and positioning, the five bushings 41, 42, 43, 44 and 45 are utilized. The bushing 40, which is diametrically opposite bushing 44, and the bushing 46, which is diametrically opposite bushing 42, will be utilized in a slight modification of the valve body which requires machining on the rear sides of the seat portions 55ᵈ and 55ᵉ, in which event the machining on the rear side of the seat portion 55ᵈ is best accomplished by turning the cradle and valve body 180° from the position shown in Fig. 13, and the machining on the rear portion of the seat portion 55ᵉ is best accomplished by turning the cradle and valve body 180° from the position shown in Fig. 14.

Figure 7:
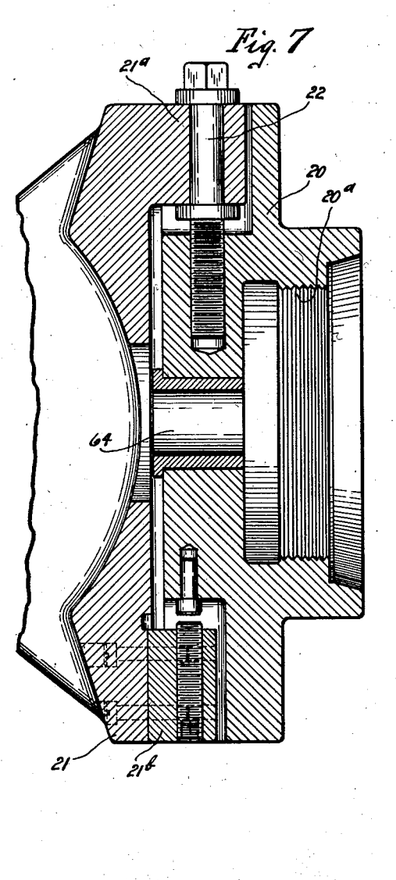
Fig. 7 is a sectional view substantially along the line 7—7 of Fig. 6.

When all these machining operations are being accomplished, the tool holding bar is extended into the valve body and it is braced during these machining operations by means of a pilot bushing 64 which is arranged centrally in the adapter as shown in Figs. 2, 4 and 7, the rear part of the chuck body having an opening to permit the passage of the inner end of the tool holding bar and there being sufficient clearance to avoid interference with the bar when the chuck body is in either of its off-center positions, as well as in its center position.

Figure 17:
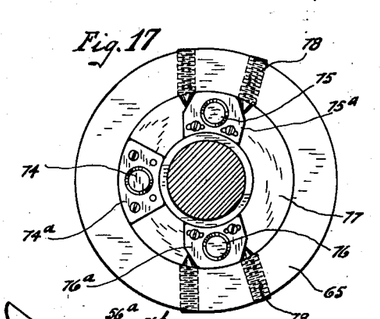
Fig. 17 is a fragmentary sectional view substantially along the line 17—17 of Fig. 15.

As previously stated, in Figs. 15, 16 and 17 we have shown a modification in the work holder to adapt it for machining the gate which is to be used with the valve body 55. The adapter and chuck body of the chuck will be the same as previously described, but the U-shaped work holder 29 is replaced with a two-part work holder, the two parts being trunnioned as before in the arms of the chuck body, and when the work is clamped therein, become a unit which may turn as one piece which may be rotated and clamped in position like the work holder previously described. One part of this work holder consists of a disk 65 having a trunnion 66 which may in this instance be integral with the disk and similar in all respects to the trunnion 30 of the previously described construction. The disk is drawn into engagement with the inner race of the same ball bearing 33 used in the construction first described. On the inner face of the disk 65 is a clamping rail 67 carrying a clamp 68 secured to the rail by clamping screws 69.

The other part of the work holder consists of a disk 70 which is secured to the disk 31ᵃ of the trunnion 31 of the first described construction. The clamp 52 functions with this chuck assembly precisely as previously described. On the inner face of the disk 70 is a clamping rail 71 carrying a clamp 72 secured to the former by clamping screws 73.

The work piece, consisting in this instance of the gate 56, is provided on its opposite edges with guide ribs 56ᵉ which are adapted to slide in the guide slots 55ᶠ of the valve body, and when the gate is placed in this two-part work holder it bridges the space between them and these guide ribs are then tightly clamped between the clamping rails and clamps, thus creating, as previously stated, a rigid unitary structure which is rotated, positioned and clamped as if formed of one piece.

The machine work to be done on this gate requires the work holder to be definitely located in three positions. The locating of the work holder in these positions is accomplished by means of the center lock bolt 37, the other two lock bolts 38 and 39 then being preferably held in their retracted positions by the screws 51 previously described. This lock bolt cooperates with three bushings 74, 75 and 76 which are carried on the inner face of the disk 65. In case the angularity of the sides 56ᶜ and 56ᵉ varies, it may be desirable to adjustably support the bushings, and in Fig. 17 we have shown the three bushings carried by plates 74ᵃ, 75ᵃ and 76ᵃ.

These plates are mounted in an annular groove 77 of the disk 65 and are secured in place by screws. The two plates 75ª and 76ª are adjustably mounted in the groove and are designed to be adjusted circumferentially by adjusting screws 78 of suitable form engaging the plates. Not only does the bushing adjustment thus provided adapt the work holder for work pieces, such as valve gates, having faces inclined relatively at different angles, but it facilitates the assembly in so far as the proper locating of the bushings is concerned.

While we have shown the preferred construction with one modification in the work holder, we do not desire to be confined to the precise details shown but aim to cover such modifications as do not involve a departure from the spirit and scope of the invention. Furthermore, though we have described the chuck with a trunnioned work holder in the form of a cradle adapted to accommodate a work piece consisting of a particular form of valve body, and have described the trunnioned two-part work holder of Figs. 15 to 17 as being adapted to accommodate the gate of said valve body, we wish it understood that both types of work holders may be employed in connection with other kinds of work pieces. Furthermore, it might be stated that though we have illustrated removable and relatively adjustable lock bolt bushings in connection with the modified work holder of Figs. 15 to 17, similar features of removability and adjustability may be applied to the U-shaped work holder shown in the preceding figures of the drawings.

Having thus described our invention, we claim:

1. A chuck comprising a chuck body, a work holder in the form of the unit rotatably supported by the chuck body, locating means for positioning the work holder in predetermined positions, and tapered means for clamping the work holder in such positions.

2. A chuck comprising a chuck body, a trunnioned work holder carried thereby, and a wedge ring arranged concentric with the axis of rotation to secure the work holder in different positions.

3. A chuck comprising a chuck body, a work holder rotatably supported therein, means for locating the work holder in definite positions, and a wedge ring arranged concentric with the axis of rotation to clamp the work holder in such positions.

4. A chuck having a member movable to different angular positions, a plurality of devices for holding said member in its different positions, and a single controlling means for said devices.

5. A chuck comprising a supporting member, a chuck body slidably mounted thereon laterally of the axis of the chuck body, means for moving said chuck body laterally from a central working position to other working positions, and separate holding means for positioning the chuck body in each of said positions.

6. A chuck comprising a supporting member, a chuck slidably mounted thereon laterally of the axis of the chuck body, means for moving said chuck body laterally from a central working position to other working positions, and locating means for positioning the chuck body in said positions, said locating means including members adapted to abut to position the chuck body in one or more working positions laterally of its central position.

7. A chuck comprising a chuck body with two spaced walls, a work holder having trunnions with bearings in said walls, and a clamp independent of said bearings for holding the work holder in different positions and arranged to engage one of said trunnions.

8. A chuck comprising a chuck body with two spaced walls, a work holder having trunnions with bearings in said walls, and a clamp independent of said bearings extending about one of said trunnions and adapted to engage the same.

9. A chuck comprising a chuck body, and a substantially U-shaped work holder rotatably supported therein and having adjustable work engaging members mounted in the base and sides thereof to support the work piece against movement in a plurality of planes.

10. A chuck comprising a chuck body, and a substantially U-shaped work holder rotatably supported therein and having adjustable work engaging members mounted in the base and sides thereof and having work engaging means extending between the sides to support the work piece against movement in a plurality of planes.

11. A chuck comprising a chuck body having a work holder with bearings in the chuck body to permit it to rotate therein and provided with an annular clamping surface, and a clamp engageable with said surface for holding the work holder in different working positions.

12. A chuck comprising a chuck body having a work holder with bearings in the chuck body to permit it to rotate therein and provided with an annular clamping portion, and a tapered clamping member adapted to engage said surface.

13. A chuck comprising a chuck body having a work holder with bearings in the chuck body to permit it to rotate therein, the work holder and chuck body having oppositely disposed clamping surfaces, and a wedge-shaped clamp adapted to engage said surfaces.

14. A chuck comprising a chuck body, a work holder supported thereby and having bearings in the chuck body to permit it to rotate therein, and a friction clamp for engaging the work holder independent of said bearings to hold it in different working positions.

15. A chuck comprising a chuck body, a work holder rotatably supported thereby, a lock bolt engageable with the work holder, and a friction clamp also engageable with the work holder.

16. A chuck comprising a chuck body, a rotatable work holder supported thereby, and means for locating the work holder in different working positions comprising a lock bolt and a lock bolt bushing, one carried by the chuck body and the other by the work holder and one adustable laterally relative to the other.

17. A chuck comprising a chuck body having a work holder with bearings in the chuck body to permit it to rotate therein and provided with adjustable devices for engaging the top, bottom and ends of the work piece for adjusting the same in vertical, horizontal and angular planes and for holding the same against movement in any direction.

In testimony whereof, we hereunto affix our signatures.

WILLIAM L. TRUMPHOUR.
MAX E. LANGE.